US012602338B1

(12) United States Patent
Majeau et al.

(10) Patent No.: US 12,602,338 B1
(45) Date of Patent: Apr. 14, 2026

(54) SOFTWARE INTERRUPT MANAGEMENT SYSTEM FOR SYMMETRIC MULTIPROCESSING DEVICES

(71) Applicant: Silicon Laboratories Inc., Austin, TX (US)

(72) Inventors: Louis-Philippe Majeau, Ste-Marthe-sur-le-lac (CA); Jean Francois Deschenes, Ste-Marthe-sur-le-lac (CA)

(73) Assignee: Silicon Laboratories Inc., Austin, TX (US)

( * ) Notice: Subject to any disclaimer, the term of this patent is extended or adjusted under 35 U.S.C. 154(b) by 8 days.

(21) Appl. No.: 18/945,719

(22) Filed: Nov. 13, 2024

(51) Int. Cl.
   *G06F 13/26* (2006.01)

(52) U.S. Cl.
   CPC .................................. *G06F 13/26* (2013.01)

(58) Field of Classification Search
   CPC ..................................................... G06F 13/26
   See application file for complete search history.

(56) References Cited

U.S. PATENT DOCUMENTS

| 4,819,229 | A | * | 4/1989 | Pritty | ...................... G06F 13/26 |
|---|---|---|---|---|---|
| | | | | | 370/455 |
| 4,905,234 | A | * | 2/1990 | Childress | ................ H04L 1/189 |
| | | | | | 370/349 |
| 5,935,220 | A | * | 8/1999 | Lumpkin | .............. G06F 13/126 |
| | | | | | 710/48 |

OTHER PUBLICATIONS

ARM Ltd., Cortex-M3 Revision: r1p1, Technical Reference Manual. Chapter 8 "Nested Vectored Interrupt Controller," 42 pages, Jan. 2006.

* cited by examiner

*Primary Examiner* — Henry Tsai
*Assistant Examiner* — John B Roche
(74) *Attorney, Agent, or Firm* — Nields, Lemack & Frame, LLC

(57) ABSTRACT

A system and method of handling interrupts in a symmetric multiprocessing system is disclosed. The symmetric multiprocessing system may comprise a plurality of ARM processors, such as Cortex-M processors. All of the possible interrupt sources are routed to all of the processing units. A message handling unit (MHU) is used to communicate between processing units to relay information about the interrupts. A MHU interrupt service routine is used to handle the enabling and disabling of the various interrupt sources, as requested by the other processing unit. The MHU interrupt service routine also tracks whether the interrupt that is to be disabled is currently executing.

18 Claims, 4 Drawing Sheets

SOFTWARE INTERRUPT MANAGEMENT SYSTEM FOR SYMMETRIC MULTIPROCESSING DEVICES

FIELD

This disclosure describes systems and methods for the management of interrupts in a symmetric multiprocessing system.

BACKGROUND

The use of multiple processors in a system has increased significantly in recent years. Devices such as servers, laptop computers and other devices are now commonly available with multiple processing units.

These multiple processing units may be configured to operate in one of two modes; asymmetric multiprocessing or symmetric multiprocessing. In asymmetric multiprocessing, certain tasks are assigned to specific processing units, while in symmetric multiprocessing, a task may be assigned to any of the processing units. In other words, it is not possible to determine which tasks or interrupt services routines (ISRs) will be executed by which processing unit.

In some embodiments, chip designers have incorporated additional features into these processing units to allow them to function seamlessly. However, there are processing units that are not optimized for a symmetric multiprocessing configuration. Consequently, there may be issues associated with using these processing units in a symmetric multiprocessing configuration.

One such issue is the handling of interrupts. Interrupt service routines may be executed on any of the processing units. Therefore, if a task or application wishes to disable or enable a particular interrupt, it is unclear which processing unit needs to be notified.

Therefore, a system and method of handling interrupts in a symmetric multiprocessing system would be advantageous.

SUMMARY

A system and method of handling interrupts in a symmetric multiprocessing system is disclosed. The symmetric multiprocessing system may comprise a plurality of ARM processors, such as Cortex-M processors. All of the possible interrupt sources are routed to all of the processing units. A message handling unit (MHU) is used to communicate between processing units to relay information about the interrupts. A MHU interrupt service routine is used to handle the enabling and disabling of the various interrupt sources, as requested by the other processing unit. The MHU interrupt service routine also tracks whether the interrupt that is to be disabled is currently executing or pending.

According to one embodiment, a symmetric multiprocessor system is disclosed. The symmetric multiprocessor system comprises a first processing unit having a first interrupt controller and a first message handling unit (MHU); a second processing unit having a second interrupt controller and a second MHU; one or more interrupt sources in communication with the first processing unit and the second processing unit; wherein a write by the first processing unit to the second MHU triggers an MHU interrupt in the second processing unit; and wherein the second processing unit comprises an MHU interrupt service routine (ISR) that is configured to: read a message from the second MHU after an MHU interrupt is triggered, wherein the message comprises a request from the first processing unit to configure the second interrupt controller; configure the second interrupt controller accordingly; and if the message is not requesting that an interrupt be disabled, transmit an acknowledgment to the first MHU. In some embodiments, if the message is requesting that the interrupt be disabled, the acknowledgment is not transmitted until it is determined that the ISR associated with the interrupt to be disabled is not executing and not pending. In some embodiments, if the message is requesting that the interrupt be disabled, the MHU ISR is configured to: determine if the interrupt to be disabled is active or pending; if the interrupt to be disabled is not active and not pending, transmit an acknowledgment to the first MHU; and if the interrupt to be disabled is active or pending, not transmit an acknowledgment to the first MHU. In certain embodiments, if the interrupt to be disabled is executing and is preempted by a higher priority interrupt, the acknowledgment is not transmitted until the interrupt to be disabled completes execution. In certain embodiments, if the message is requesting that the interrupt be disabled, and the interrupt to be disabled is active or pending, the MHU ISR is configured to set a disable_irq flag. In certain embodiments, an ISR of the interrupt to be disabled includes an exit hook function. In certain embodiments, the exit hook function includes instructions to: determine if the disable_irq flag associated with this interrupt is set; if the disable_irq flag is not set, exit the ISR; and if the disable_irq flag is set, transmit the acknowledgment to the first MHU. In some embodiments, the message requests that an interrupt be enabled. In some embodiments, the message requests that all interrupts be enabled. In some embodiments, the message requests that an interrupt be disabled. In some embodiments, the message requests that all interrupts be disabled. In some embodiments, the message requests a change to a priority of an interrupt. In some embodiments, the message requests an interrupt be assigned to a particular processing unit.

According to another embodiment, a processing unit for use in a symmetric multiprocessor system is disclosed. The processing unit comprises an interrupt controller; a message handling unit (MHU); and a memory comprising: a MHU interrupt service routine (ISR); and at least one additional ISR, having an exit hook; wherein the MHU ISR is executed when a message is written to the MHU; and the MHU ISR includes instructions to: read the message, wherein the message comprises a request to configure the interrupt controller; configure the interrupt controller accordingly; and transmit an acknowledgment if the request was not to disable an interrupt. In some embodiments, the MHU ISR includes instructions to: transmit the acknowledgment if the request was to disable an interrupt and the interrupt was not active or pending. In some embodiments, the ISR includes to: set a instructions MHU disable_irq flag and not transmit the acknowledgment if the interrupt is active or pending. In certain embodiments, the exit hook function includes instructions to: determine if the disable_irq flag associated with this interrupt is set; if the disable_irq flag is not set, exit the at least one additional ISR; and if the disable_irq flag is set, transmit the acknowledgment. In some embodiments, the message requests an interrupt be enabled, an interrupt be disabled, a priority of an interrupt be modified, or an interrupt be assigned to the processing unit.

BRIEF DESCRIPTION OF THE DRAWINGS

For a better understanding of the present disclosure, reference is made to the accompanying drawings, in which like elements are referenced with like numerals, and in which.

DETAILED DESCRIPTION

Figure 1:
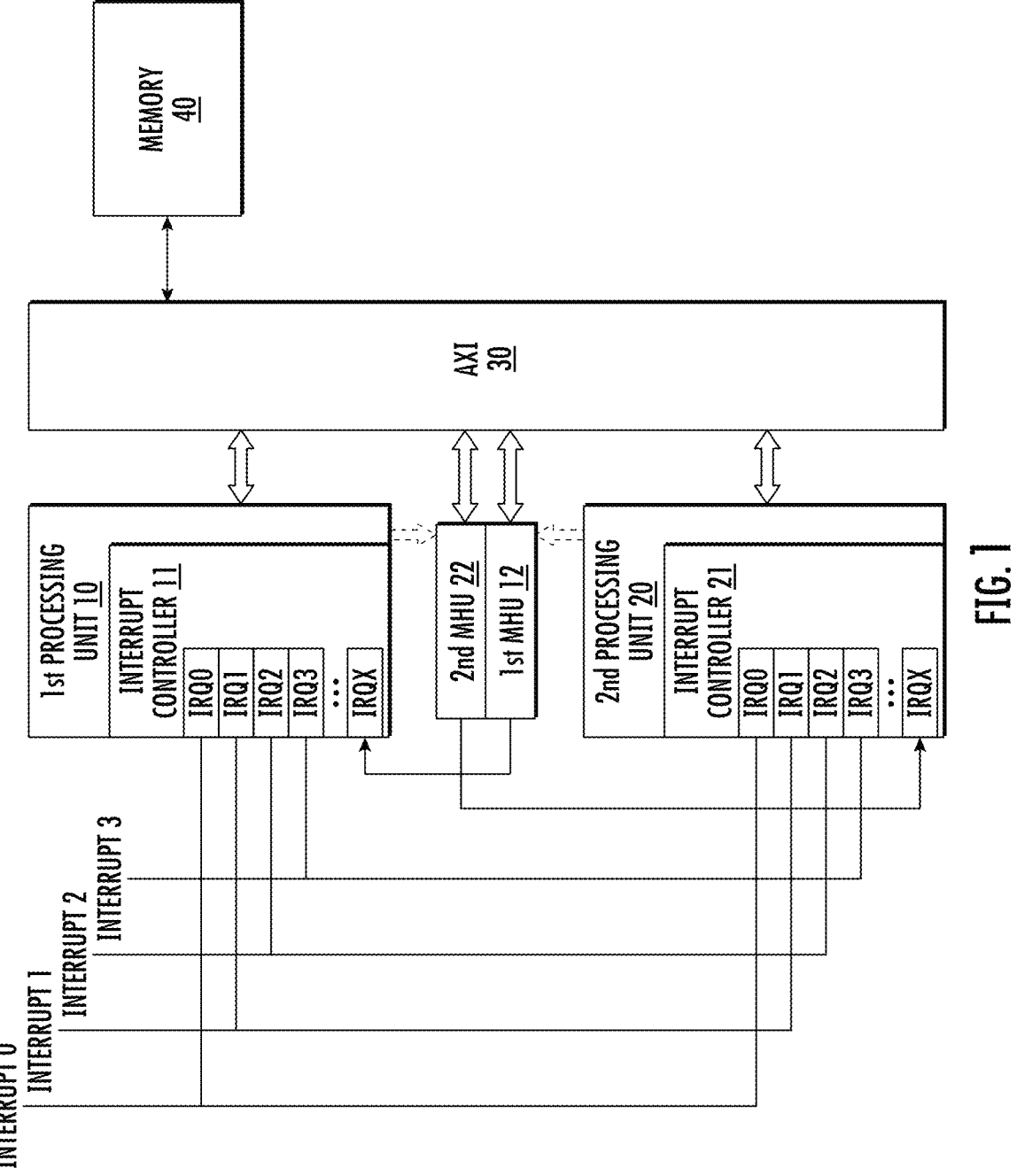
FIG. 1 is a block diagram of a symmetric multiprocessing system.

FIG. 1 shows a symmetric multiprocessing system. The system includes a first processing unit 10 and a second processing unit 20. These processing units may be ARM processors, such as CORTEX-M processors. These two processing units may both be connected to a common bus, referred to as an AXI (Advanced extensible Interface) bus 30. This AXI bus 30 is an on-chip communication bus used to connect the processing units to other components within the system on chip (SoC) device. For example, a memory device 40 may be accessible to both processing units. This memory device 40 may be a volatile memory, such as a RAM or DRAM, or may be a nonvolatile memory, such as a FLASH ROM or ROM. Further, the memory device 40 may include instructions. These instructions may include interrupt service routines, tasks, applications, and other functions.

Each processing unit may also include an interrupt controller 11, 21. The interrupt controllers are circuits that include logic gates, flip-flops, registers and other combinational logic. The interrupt controller 11,21 includes a register to allow each interrupt source to be enabled or disabled. The interrupt controller 11, 21 also includes a status register that indicates which interrupts are currently active. This refers to the fact that the interrupt service routine for that interrupt source has been called and has not yet terminated execution. Note that an interrupt service routine that has been preempted is still considered active. Finally, the interrupt controller 11, 21 may include a status register to indicate which interrupt sources are pending. This refers to the state where an interrupt has been raised, but has not yet been serviced by the processing unit.

Each processing unit also has an associated message handling unit (MHU) 12, 22 that the other processing unit can access. These MHUs are used to communicate between the processing units 10, 20. The first MHU 12 allows the second processing unit 20 to write a message for the first processing unit 10 and to generate an interrupt for the first processing unit 10 to alert the first processing unit 10 that there is a message for it. Similarly, the second MHU 22 allows the first processing unit 10 to write a message for the second processing unit 20 and to generate an interrupt for the second processing unit 20 to alert it of the new message.

As shown in FIG. 1, all of the interrupt sources are connected to both of the processing units 10, 20. While FIG. 1 shows four external interrupt sources, it is understood that there may be more or fewer interrupt sources and the number of interrupt sources is not limited by this disclosure. Further, in some embodiments, each interrupt source is assigned to a specific processing unit. For example, interrupt 0 may always be serviced by the first processing unit 10, while a different interrupt may always be serviced by the second processing unit 20. In certain embodiments, the system is initialized so that some or all interrupt are assigned to the first processing unit 10. Interrupts may then be assigned by either the first processing unit 10 or the second processing unit 20 to itself or another processing unit.

Further, the first MHU 12 generates an interrupt for the first processing unit 10, while the second MHU 22 generates an interrupt (at the same priority) for the second processing unit 20. In certain embodiments, the priority of the MHU interrupt is higher than the priority of any of the interrupt sources. In this way, the MHU interrupt is able to preempt any other interrupt source. In another embodiment, application level interrupts (i.e. interrupts associated with applications that are executed by the processing units) may have higher priority than the MHU interrupt.

An API (application programming interface) is defined for communications between the processing units. This API is used to communicate information regarding various interrupts and their status. Some of the APIs are defined below:

Disable_interrupts(CPU core): this API is used to disable all of the interrupts in the processing unit that is identified in the argument.

Disable_irq(irq_number): this API is used to disable the interrupt specified in the argument.

Enable_interrupts(CPU core): this API is used to enable all of the interrupts in the processing unit that is identified in the argument.

Enable_irq(irq_number): this API is used to enable the interrupt specified in the argument.

Set_irq_priority(irq_number, priority): this API is used to change the priority of the interrupt specified in the first argument to the value specified in the second argument.

Assign_irq(irq_number, CPU core): this API is used to assign the interrupt specified in the first argument to the processing unit specified in the second argument.

Note that each of these APIs is used to modify an attribute of an interrupt. This may be performed by proper configuration of the respective interrupt controller.

In response to each of these APIs, the destination processing unit will respond with a message indicating that the requested action has been completed. As an example, if the second processing unit 22 received a message in the second MHU 22 requesting that all interrupts be enabled, the second processing unit 20 would configure the second interrupt controller 21 accordingly. Once the second interrupt controller 21 is properly configured, the second processing unit 20 will write an acknowledgment message in the first MHU 12, informing the first processing unit 10 that the action has been completed.

Situations may arrive where a task (or interrupt service routine) may want to ensure that it is not interrupted. For example, assume a first task (or ISR) in the first processing unit 10 may need exclusive access to a shared resource, such as a semaphore or flag. To achieve this in a single processor system, the first task would simply disable any other interrupts that may access this shared resource to ensure that it is not accessed by another task or ISR. However, in a multiprocessor system, it is also possible that a second task or ISR executing on the second processing unit 20 may access the shared resource. Therefore, before this shared resource can be accessed by the first task, any interrupts that may access this shared resource must also be disabled on the other processing units. Thus, in this example, the first task would write a message in the second MHU 22 using the disable_irq API or the disable_interrupts API. This would trigger an interrupt in the second processing unit 22. The ISR associated with the second MHU 22 would then disable the desired interrupts. Once the first task receives an acknowledgment from the second processing unit 20 that the interrupts in question have been disabled, the first task may then access the shared resource without fear of corruption.

While this approach covers most situations, there are some exceptions. Assume for example, the second processing unit 20 is currently executing an ISR that accesses that shared resource. Simply disabling the interrupt will not prevent the already executing ISR from accessing the shared resource. Therefore, an additional feature is defined.

Figure 2:
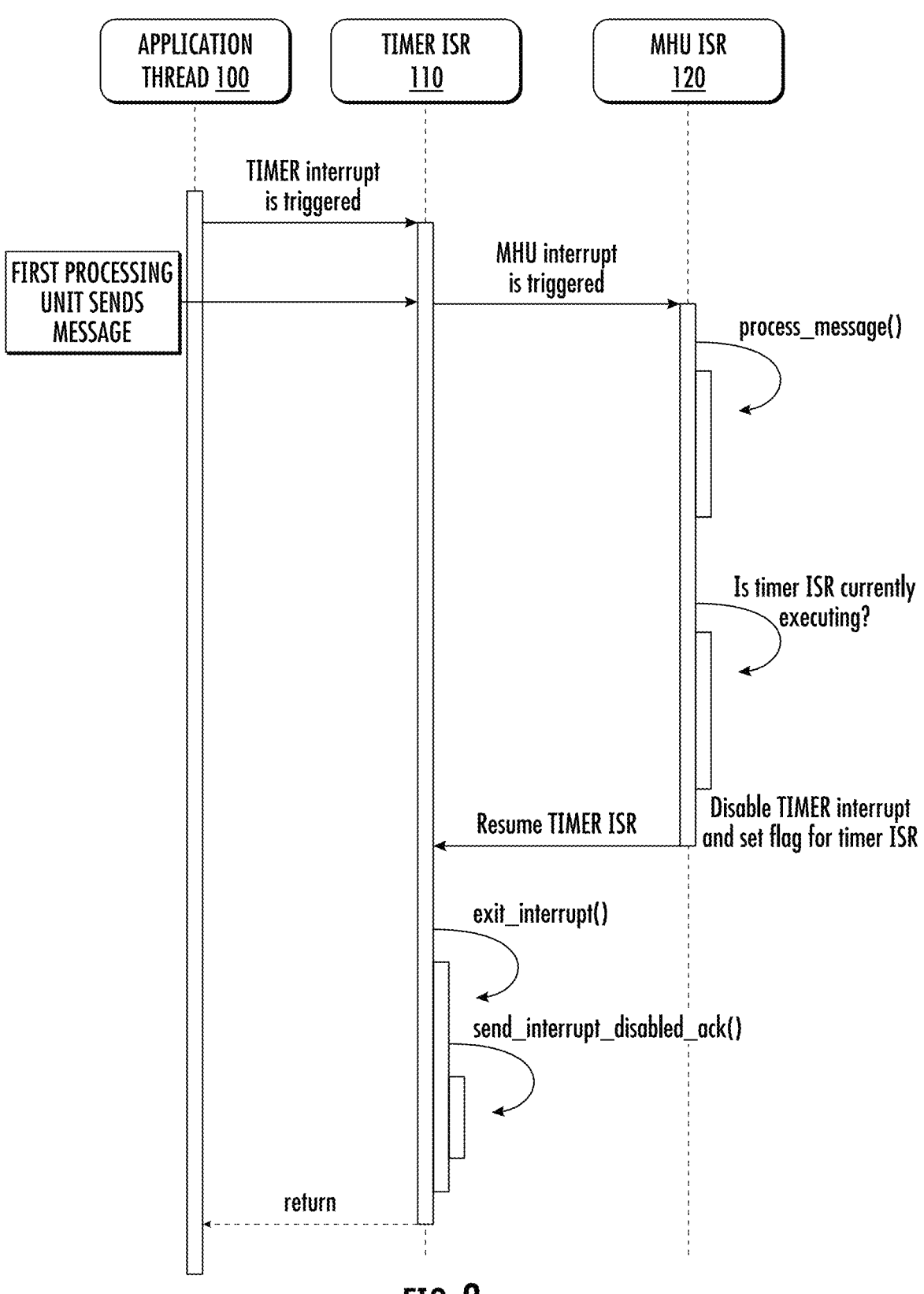
FIG. 2 is a flow chart showing the operation of the system when an interrupt is to be disabled.

In the present system, each interrupt service routine will include an exit hook. An exit hook is a function executed at the end of the interrupt service routine prior to exiting the ISR. The exit hook will check if the interrupt associated with this ISR was disabled by the other processing unit while this ISR was active. FIG. 2 shows a flow chart showing the operation of the MHU ISR and the ISR exit hook in the second processing unit 20.

In this example, it is assumed that the timer interrupt is to be disabled in the second processing unit 20. Further, it is assumed that the MHU ISR has a higher priority than the timer ISR. First, the timer ISR 110 is triggered in the second processing unit 20. The timer ISR 110 then begins executing. Sometime after the timer ISR 110 has begun executing, the first processing unit 10 sends a disable_irq API, indicating that the timer interrupt is to be disabled. The transmission of this API causes an interrupt, that is at a higher priority than the timer interrupt. Consequently, the timer ISR 110 is preempted by the MHU ISR 120. The MHU ISR 120 processes the message from the first processing unit 10. It then checks to see if the timer ISR 110 is currently active. Since it is, the MHU ISR 120 disables the timer interrupt and sets a disable_irq flag for the timer ISR 110. The disable_irq flag may be a data structure that includes a separate bit for each possible interrupt that can be disabled or enabled. The MHU ISR 120 then terminates, returning control to the timer ISR 110. Note that the MHU ISR 120 does not return an acknowledgment at this time since it is possible that the timer ISR 110 will still access the shared resource. At a later time, the timer ISR 110 finishes its execution. Before terminating, the timer ISR 110 executes the exit hook function. The exit hook function notes that the disable_irq flag associated with this interrupt was set by the MHU ISR 120. Consequently, it now transmits an acknowledgment back to the first processing unit 10. Control then returns to the application thread 100.

Figure 3:
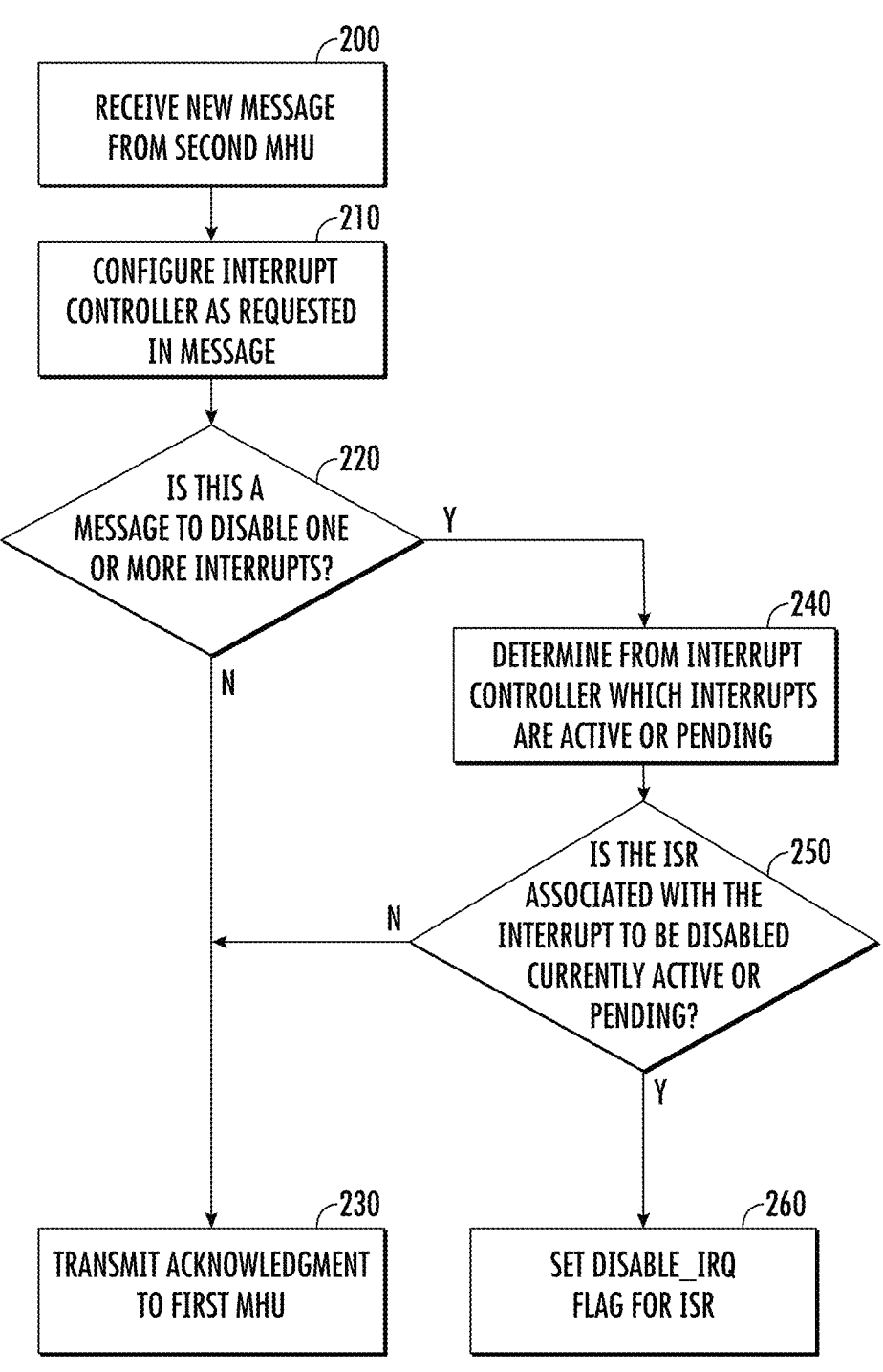
FIG. 3 shows the flow chart of the message handler unit (MHU) interrupt service routine.

FIG. 3 shows the operation of the MHU ISR 120 according to one embodiment. First, as shown in Box 200, the MHU ISR receives a message in the second MHU 22. The MHU ISR 120 then interprets the message and configures the interrupt controller 21 as instructed, as shown in Box 210. This may involve assigning an interrupt to this processing unit, changing the priority of an interrupt, enabling one or more interrupts or disabling one or more interrupts. The MHU ISR 120 then checks if this message was to disable an interrupt, as shown in Decision Box 220. If it is not, then the MHU ISR 120 may transmit the acknowledgment back to the first processing unit 10 via the first MHU 12, as shown in Box 230. This is possible as the action is now complete.

If, however, this was a message to disable an interrupt, the MHU ISR 120 then checks the status register in the interrupt controller to determine which interrupts are currently active or pending, as shown in Box 240. The MHU ISR 120 then checks if the ISR associated with the interrupt to be disabled is currently active or pending, as shown in Decision Box 250. If the ISR associated with this interrupt is not active and is not pending, then the MHU ISR 120 may transmit the acknowledgment, as shown in Box 230. If, however, the ISR associated with that interrupt is active or pending, the MHU ISR 120 simply sets the disable_irq flag for that interrupt, as shown in Box 260. Thus, if the ISR associated with the interrupt that is to be disabled was active or pending, the MHU ISR 120 does not transmit an acknowledgment.

Figure 4:
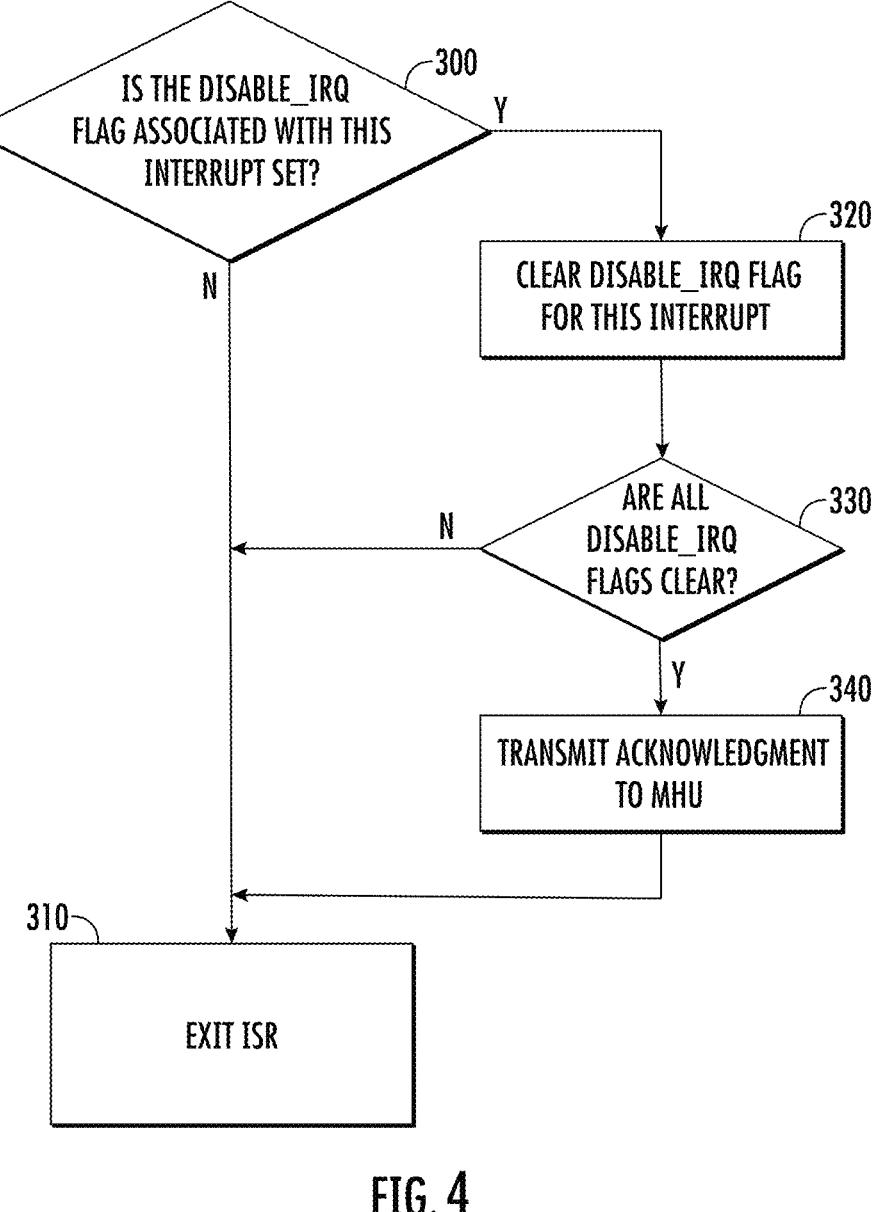
FIG. 4 shows the flow chart of the exit hook function of an interrupt.

FIG. 4 shows the operation of the exit hook function. As shown in Decision Box 300, the exit hook function checks the disable_irq flag associated with its interrupt to see if it is set. If the disable_irq flag is not set, no other actions are performed, as shown in Box 310. However, if the disable_irq flag associated with this interrupt is set, the exit hook function clears the disable_irq flag associated with this interrupt, as shown in Box 320. It then checks to see if all of the disable_irq flags are now clear, as shown in Decision Box 330. This is done in the case that several interrupts have been disabled. In that scenario, only the last ISR should return the acknowledgment. If all disable_irq flags are not clear, no other actions are performed as shown in Box 310. However, if all of the disable_irq flags are now all clear, the exit hook function transmits the acknowledgment back to the first MHU 12, as shown in Box 340. Note that in certain embodiments, only one disable_irq flag is set at a time. In this embodiment, Decision Box 330 may be omitted.

The present system and method has many advantages. This system allows two processing units to operate as a symmetric multiprocessing system. Issues that may occur due to the interrupt service routines executing on different processing units are addressed with only minimal overhead. In fact, the ISR exit hook function contains only a few lines of code. In this way, exclusive access to resources may be guaranteed, even in a symmetric multiprocessor system. Further, from a user point of view, the experience is very similar to a single core system. This allows the same code to be used on either single or multi-core systems.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, other embodiments and such modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A symmetric multiprocessor system, comprising:
a first processing unit having a first interrupt controller and a first message handling unit (MHU);
a second processing unit having a second interrupt controller and a second MHU; and
one or more interrupt sources in communication with the first processing unit and the second processing unit;
wherein a write by the first processing unit to the second MHU triggers an MHU interrupt in the second processing unit; and
wherein the second processing unit comprises an MHU interrupt service routine (ISR) that is configured to:
read a message from the second MHU after an MHU interrupt is triggered, wherein the message comprises a request from the first processing unit to configure the second interrupt controller;

configure the second interrupt controller accordingly; and if the message is not requesting that an interrupt be disabled, transmit an acknowledgment to the first MHU.

2. The symmetric multiprocessor system of claim 1, wherein if the message is requesting that the interrupt be disabled, the acknowledgment is not transmitted until it is determined that the ISR associated with the interrupt to be disabled is not executing and not pending.

3. The symmetric multiprocessor system of claim 1, wherein if the message is requesting that the interrupt be disabled, the MHU ISR is configured to:

determine if the interrupt to be disabled is active or pending;

if the interrupt to be disabled is not active and not pending, transmit an acknowledgment to the first MHU; and if the interrupt to be disabled is active or pending, not transmit an acknowledgment to the first MHU.

4. The symmetric multiprocessor system of claim 3, wherein if the interrupt to be disabled is executing and is preempted by a higher priority interrupt, the acknowledgment is not transmitted until the interrupt to be disabled completes execution.

5. The symmetric multiprocessor system of claim 3, wherein if the message is requesting that the interrupt be disabled, and the interrupt to be disabled is active or pending, the MHU ISR is configured to set a disable_irq flag.

6. The symmetric multiprocessor system of claim 5, wherein an ISR of the interrupt to be disabled includes an exit hook function.

7. The symmetric multiprocessor system of claim 6, wherein the exit hook function includes instructions to:

determine if the disable_irq flag associated with this interrupt is set;

if the disable_irq flag is not set, exit the ISR; and if the disable_irq flag is set, transmit the acknowledgment to the first MHU.

8. The symmetric multiprocessor system of claim 1, wherein the message requests that an interrupt be enabled.

9. The symmetric multiprocessor system of claim 1, wherein the message requests that all interrupts be enabled.

10. The symmetric multiprocessor system of claim 1, wherein the message requests that an interrupt be disabled.

11. The symmetric multiprocessor system of claim 1, wherein the message requests that all interrupts be disabled.

12. The symmetric multiprocessor system of claim 1, wherein the message requests a change to a priority of an interrupt.

13. The symmetric multiprocessor system of claim 1, wherein the message requests an interrupt be assigned to a particular processing unit.

14. A processing unit for use in a symmetric multiprocessor system, comprising:

an interrupt controller;

a message handling unit (MHU); and a memory comprising:

a MHU interrupt service routine (ISR); and at least one additional ISR, having an exit hook;

wherein the MHU ISR is executed when a message is written to the MHU; and the MHU ISR includes instructions to:

read the message, wherein the message comprises a request to configure the interrupt controller;

configure the interrupt controller accordingly; and transmit an acknowledgment if the request was not to disable an interrupt.

15. The processing unit of claim 14, wherein the MHU ISR includes instructions to:

transmit the acknowledgment if the request was to disable an interrupt and the interrupt was not active or pending.

16. The processing unit of claim 14, wherein the MHU ISR includes instructions to:

set a disable_irq flag and not transmit the acknowledgment if the interrupt is active or pending.

17. The processing unit of claim 16, wherein the exit hook function includes instructions to:

determine if the disable_irq flag associated with this interrupt is set;

if the disable_irq flag is not set, exit the at least one additional ISR; and if the disable_irq flag is set, transmit the acknowledgment.

18. The processing unit of claim 14, wherein the message requests an interrupt be enabled, an interrupt be disabled, a priority of an interrupt be modified, or an interrupt be assigned to the processing unit.

* * * * *